United States Patent [19]

Kirsch

[11] 4,113,296
[45] Sep. 12, 1978

[54] BUMPERS ON MOTOR VEHICLES
[75] Inventor: Norbert Kirsch, Heidesheim, Fed. Rep. of Germany
[73] Assignee: General Motors Corporation, Detroit, Mich.
[21] Appl. No.: 776,202
[22] Filed: Mar. 10, 1977
[30] Foreign Application Priority Data
Mar. 24, 1976 [DE] Fed. Rep. of Germany ... 7609080[U]
[51] Int. Cl.² .......................................... B60R 19/00
[52] U.S. Cl. ....................................................... 293/96
[58] Field of Search ................. 293/62, 71 R, 70, 73, 293/74, 83, 85–87, 89, 91, 95, 99, 96

[56] References Cited
U.S. PATENT DOCUMENTS
3,433,520 3/1969 Kearns et al. ............................ 293/85

| 3,738,696 | 6/1973 | McLauchlan | 293/99 |
| 3,773,373 | 11/1973 | McLauchlan | 293/99 |
| 3,795,418 | 3/1974 | Barenyi et al. | 293/86 |
| 3,840,259 | 10/1974 | Barenyi | 293/70 |
| 3,850,466 | 11/1974 | Yepis | 293/89 |

Primary Examiner—Trygve M. Blix
Assistant Examiner—Jesus D. Sotelo
Attorney, Agent, or Firm—Charles R. White

[57] ABSTRACT

A motor vehicle bumper end mounting includes two retainer arms each secured at one end to a respective end of the bumper and grippingly received and resiliently retained at its other end in a respective one of a pair of anchorages on the vehicle body so that in the event of an impact on the bumper the ends can move thus minimizing the possibility of deformation of the vehicle body at the anchorages.

4 Claims, 4 Drawing Figures

BUMPERS ON MOTOR VEHICLES

BACKGROUND OF THE INVENTION

This invention relates to bumpers on motor vehicles and is concerned with resiliently mounting the ends of a bumper to portions of the vehicle side lying adjacent the bumper ends.

SUMMARY OF THE INVENTION

According to the present invention, the bumper ends are each mounted to the vehicle sides by a retainer arm which is firmly secured to the bumper ends and grippingly retained in a resilient anchorage attached to the vehicle body, so that in the event of impact loading on the bumper, it permits a displacement movement in a substantially horizontal plane of the vehicle. Advantageously, the retainer arm is cranked and has two limbs, one limb being secured to the bumper whilst the other limb is introduced into the anchorage and held therein. The resilient mounting of the bumper ends according to the present invention provides for movement thereof in a substantially horizontal plane; i.e. there is no fixed rigid attachment. The result is that any damage, tending to deform the bodywork under the action of light impacts on the bumper, is substantially eliminated.

In a preferred embodiment of the present invention, the anchorage consists of a support plate of U-shaped cross-section having oppositely arranged attachment flanges, and carries an elastic sheath which matches the U-shaped cross-section and in which the free limb of the retainer arm grippingly engages.

Insertion of the bumper ends into the anchorages, facilitates assembly of the bumper to the vehicle and assembly costs are reduced.

In a further preferred embodiment of the present invention, the support plate of the anchorage may take the form of a sheet-metal stamping with a centrally waisted flanged portion which forms the U-profile, whilst a rubber-like material of U-shaped cross-section when fitted serves as the resilient layer. Further, each support plate with its attachment flanges may be welded on to the vehicle body in the region of the front or rear wing respectively, with its longitudinal axis lying in an approximately horizontal position.

It is an object of the invention to provide a resilient mounting for the bumper ends so that in the event of an impact on the bumper the ends may be free to move in a plane generally horizontally of the vehicle without deforming the vehicle bodywork at the point of attachment of the bumper ends to the vehicle sides.

DETAILED DESCRIPTION OF A PREFERRED EMBODIMENT

Figure 1:
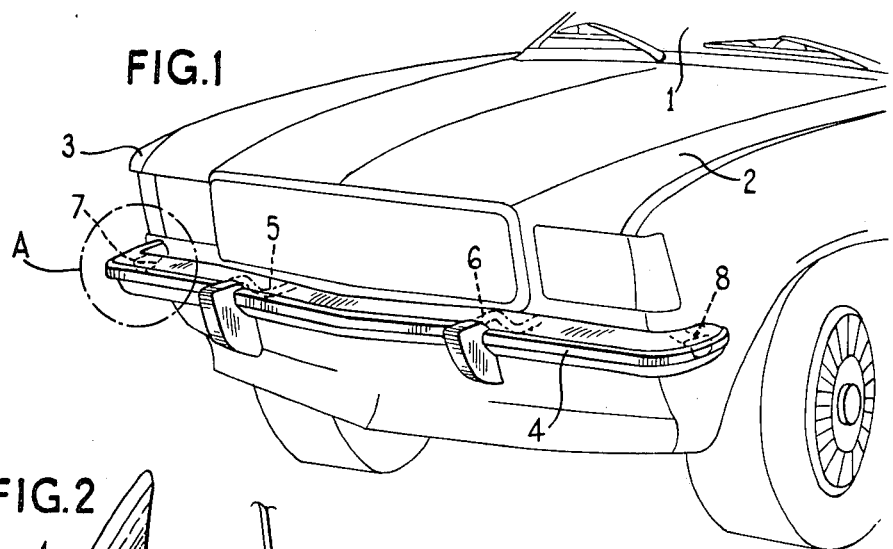
FIG. 1 is a perspective schematic view of the front part of a motor vehicle with a bumper secured at its ends in accordance with the present invention.
Figure 2:
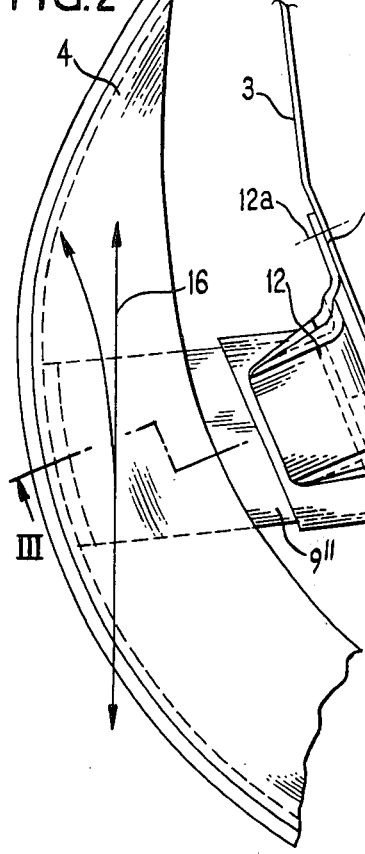
FIG. 2 is a plan of the bumper mounting on the vehicle body, shown as an enlarged cut-away A from FIG. 1.
Figure 3:
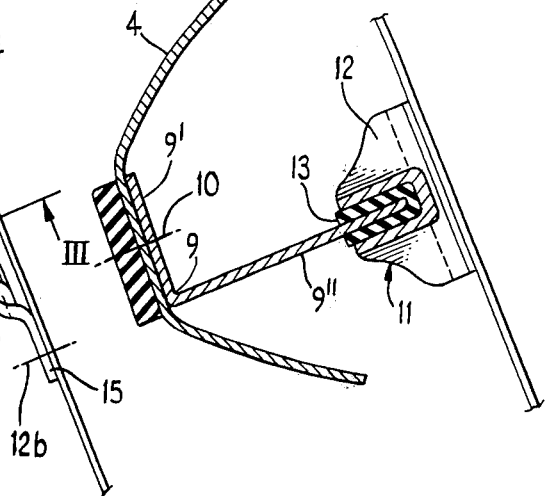
FIG. 3 is a section along line III—III through the bumper mounting according to FIG. 2.
Figure 4:
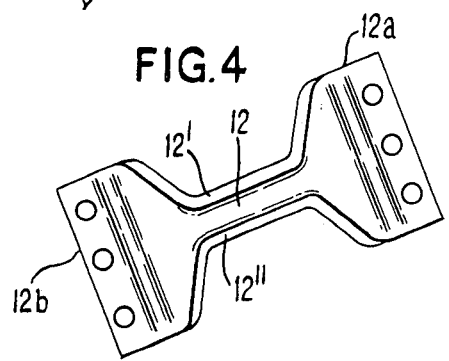
FIG. 4 is a plan of the support plate of the anchorage of FIG. 3.

In FIG. 1, reference numeral 1 denotes the windscreen, 2 the bonnet of the engine compartment, 3 the right-hand front wing and 4 the bumper on the front part of a motor vehicle body. The bumper is firmly connected in well known manner, by means of brackets 5, 6 to side members associated with the floor structure of the vehicle (not indicated in detail as they form no part of the present invention). The bumper ends which are bent to lie adjacent the wings or side bodywork of the vehicle are secured thereto in a positive yet resilient fashion at points 7 and 8. As best seen in FIGS. 2 and 3, which show one only of the two mountings since both are the same, the mounting comprises a cranked retainer arm 9 having two limbs 9', 9", one extending at an angle from the other, with the limb 9' being firmly secured to one end of the bumper 4, as shown at 10 in FIG. 3. The other limb 9" is received at its free end in a slot portion of an anchorage, generally designated 12, and is resiliently though grippingly retained therein. The anchorage 12 comprises a sheet metal stamping 12 as best seen in FIG. 4, having two generally planar end portions or attachment lugs 12a and 12b. Intermediate these lugs the plate is formed to have a waisted portion with two upstanding parallel spaced apart facing jaws or flanges 12' and 12". A layer of rubber or rubber-like material 13 is secured to the facing surfaces of the flanges and has a space between its facing surfaces which defines a slot into which the free end of the limb 9" is inserted. In effect the anchorage 12 provides a re-entrant portion defining a recess, the slot referred to above, for reception of one end of the retainer arm. When the free end of the limb 9" is inserted into the slot it compresses the layer of resilient material which is thereby tensioned, and grippingly engages the said free end to resiliently retain it. The anchorage 12 is welded to the vehicle side bodywork as indicated at 14 and 15 in FIG. 2 at a point facing the end of the bumper 4. The anchorage is so located on the bodywork as to permit movement of the bumper end in a generally horizontal plane of the vehicle in the event of an impact on the bumper.

The arrows 16 in FIG. 2 indicate the directions in which the bumper ends are free to move by reason of the resilient retention of the retainer arms in their respective anchorages in the event of a light impact loading on the bumper.

I claim:

1. A motor vehicle having mounted on one end thereof a bumper terminating at each end in a portion bent to lie adjacent a facing side portion of the vehicle, two anchorages each comprising a plate having two upstanding facing portions defining a recess, and having a layer of a resilient material on each facing portion, each anchorage being secured on a respective one of the vehicle side portions with the recess opening towards the adjacent bumper end, two cranked retainer arms comprising two limbs, one limb being secured to a respective one of the bumper ends and the other limb being grippingly received and resiliently retained in the facing recess of the anchorage whereby, in the event of an impact on the bumper, the bumper ends can move in a generally horizontal plane of the vehicle as a result of said resilient retention.

2. A motor vehicle having mounted on one end thereof a bumper terminating at each end in a portion bent to lie adjacent a facing side portion of the vehicle, two anchorages, each comprising a generally rectangular sheet metal stamping having a central waisted portion intermediate its planar ends and defined by forming said central portion with two adjacent parallel facing flanges upstanding from said stamping, and a layer of resilient material on the facing surfaces of said flanges, said facing surfaces of resilient material defining therebetween a slot portion, two cranked retainer arms each comprising two limbs one extending at an angle from the other, one limb being secured to a respective one of the bumper ends and the other being entered in the slot with a consequent compression of the layers of resilient material effective to grippingly retain the limb in the anchorage while permitting movement of the adjacent bumper end in a generally horizontal plane of the vehicle in the event of impact loading on the bumper.

3. A motor vehicle having mounted on one end thereof a bumper terminating at each end in a portion bent to lie adjacent a facing side portion of the vehicle, two anchorages, each comprising a generally rectangular sheet metal stamping having a central waisted portion intermediate its planar ends and defined by forming said central portion with two adjacent parallel facing flanges upstanding from said stamping, a block of rubber-like material inserted between said flanges and secured to the facing surfaces thereof, the facing surfaces of the block defining a slot portion, two cranked retainer arms each comprising two limbs, one extending at an angle from the other, one limb being secured to a respective one of the bumper ends and the other limb being entered in the slot with consequent compression of the block of rubber-like material effective to grippingly retain the limb in the anchorage while permitting movement of the adjacent bumper end in a generally horizontal plane of the vehicle in the event of impact loading on the bumper.

4. In a motor vehicle having outer body work with front and rear ends, an elongated bumper for said body work spaced from and extending in a horizontal plane across one end of said vehicle, said bumper terminating in end portions at the left and right ends thereof, fastener means secured to an intermediate portion of said bumper to said vehicle, and first and second mounting means movably mounting said end portions of said bumper to said outer body work of said vehicle to permit said end portions of said bumper to move laterally in said horizontal plane relative to said body work without damage thereto in response to an impact load applied to said bumper, each said mounting means comprising an anchor fixed to said body work and a cooperating bracket secured to an end of said bumper, each said anchor having opposing jaw portions outwardly projecting from said body work and forming a laterally extending slot therebetween, each said bracket having a flat tongue portion extending inwardly from said bumper and into an associated slot of saw jaw portions, a layer of resilient material disposed in said slot and sandwiched between said tongue and said jaw portions for deflection on predetermined impact loads applied to said bumper to permit said tongue portions to move horizontally relative to said associated jaw portions of said anchors and the end portion of said bumper to move in said horizontal plane.

* * * * *

UNITED STATES PATENT AND TRADEMARK OFFICE
CERTIFICATE OF CORRECTION

PATENT NO. : 4,113,296
DATED : September 12, 1978
INVENTOR(S) : Norbert Kirsch

It is certified that error appears in the above-identified patent and that said Letters Patent are hereby corrected as shown below:

Column 4, line 22, "saw" should read -- said -- .

Signed and Sealed this

Sixteenth Day of January 1979

[SEAL]

Attest:

RUTH C. MASON
Attesting Officer

DONALD W. BANNER
Commissioner of Patents and Trademarks